(12) United States Patent
Kim et al.

(10) Patent No.: US 10,943,398 B2
(45) Date of Patent: Mar. 9, 2021

(54) AUGMENTED REALITY DEVICE AND OPERATION THEREOF

(71) Applicant: Samsung Electronics, Co. Ltd., Suwon-si (KR)

(72) Inventors: Jihee Kim, Pleasanton, CA (US); Sung Ho Park, San Jose, CA (US); Simon Gibbs, Mountain View, CA (US); Anthony Liot, Mountain View, CA (US); Arnaud Renevier, Mountain View, CA (US); Lu Luo, Sunnyvale, CA (US)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 15/590,920

(22) Filed: May 9, 2017

(65) Prior Publication Data
US 2018/0018825 A1     Jan. 18, 2018

Related U.S. Application Data

(60) Provisional application No. 62/362,751, filed on Jul. 15, 2016, provisional application No. 62/448,339, (Continued)

(51) Int. Cl.
*G06T 19/00*     (2011.01)
*G06F 3/0484*     (2013.01)
(Continued)

(52) U.S. Cl.
CPC ........ *G06T 19/006* (2013.01); *G02B 27/0093* (2013.01); *G02B 27/0101* (2013.01);
(Continued)

(58) Field of Classification Search
None
See application file for complete search history.

(56) References Cited

U.S. PATENT DOCUMENTS 8,749,389 B2    6/2014   Kamen
9,171,013 B2   10/2015   Gokturk et al.
(Continued)

FOREIGN PATENT DOCUMENTS

WO     2016/012865 A2     1/2016

OTHER PUBLICATIONS

T. Dingler et al., "Multimedia Memory Cues for Augmenting Human Memory," in IEEE MultiMedia, vol. 23, No. 2, pp. 4-11, Apr.-Jun. 2016. (Year: 2016).*
(Continued)

*Primary Examiner* — James A Thompson
(74) *Attorney, Agent, or Firm* — Ruke Wang; Thomas George

(57) ABSTRACT

A device may include a camera configured to capture a live image data comprising an image of an object, and a processor coupled to the camera. The processor may be configured to recognize content of a selected portion of the live image data based on a contextual information relevant to the object using computer vision technology, and generate a visual information based on the recognized content. The device may also include an interface circuitry coupled to the processor. The interface circuitry may be configured to present the live image data, and overlay the live image data with the visual information.

20 Claims, 12 Drawing Sheets

Related U.S. Application Data filed on Jan. 19, 2017, provisional application No. 62/448,325, filed on Jan. 19, 2017, provisional application No. 62/472,497, filed on Mar. 16, 2017.

(51) Int. Cl.

| | | |
|---|---|---|
| *G06T 11/00* | (2006.01) | |
| *G06F 3/01* | (2006.01) | |
| *G06F 3/0488* | (2013.01) | |
| *G02B 30/00* | (2020.01) | |
| *G02B 27/00* | (2006.01) | |
| *G02B 27/01* | (2006.01) | |

(52) U.S. Cl.
CPC ........... *G02B 27/017* (2013.01); *G02B 30/00* (2020.01); *G06F 3/011* (2013.01); *G06F 3/012* (2013.01); *G06F 3/0488* (2013.01); *G06F 3/04842* (2013.01); *G06T 11/00* (2013.01)

(56) References Cited

U.S. PATENT DOCUMENTS

| | | | |
|---|---|---|---|
| 9,254,099 B2 | 2/2016 | Connor | |
| 9,547,938 B2 | 1/2017 | Ramkumar et al. | |
| 9,646,335 B2 | 5/2017 | Lin et al. | |
| 9,734,426 B2 | 8/2017 | Divakaran et al. | |
| 9,928,651 B2* | 3/2018 | Mariappan | G06T 19/006 |
| 2003/0208409 A1 | 11/2003 | Mault | |
| 2004/0143503 A1 | 7/2004 | Suthar | |
| 2008/0071559 A1* | 3/2008 | Arrasvuori | G06Q 30/06 |
| | | | 705/26.1 |
| 2008/0094417 A1* | 4/2008 | Cohen | A63F 13/10 |
| | | | 345/632 |
| 2008/0147730 A1 | 6/2008 | Lee et al. | |
| 2009/0289956 A1* | 11/2009 | Douris | H04W 4/21 |
| | | | 345/633 |
| 2010/0003647 A1 | 1/2010 | Brown et al. | |
| 2012/0299961 A1* | 11/2012 | Ramkumar | G06F 17/30047 |
| | | | 345/632 |
| 2013/0117025 A1 | 5/2013 | Park et al. | |
| 2013/0260345 A1 | 10/2013 | Puri et al. | |
| 2014/0300775 A1* | 10/2014 | Fan | H04N 1/32128 |
| | | | 348/231.3 |
| 2015/0070347 A1 | 3/2015 | Hofmann et al. | |
| 2015/0168729 A1* | 6/2015 | Kobayashi | G06T 19/006 |
| | | | 345/156 |
| 2015/0206343 A1* | 7/2015 | Mattila | G06T 19/006 |
| | | | 345/420 |
| 2015/0213058 A1 | 7/2015 | Ambardekar et al. | |
| 2016/0019618 A1* | 1/2016 | Lin | G06Q 30/0623 |
| | | | 705/26.61 |
| 2016/0063692 A1* | 3/2016 | Divakaran | G06K 9/6202 |
| | | | 382/110 |
| 2016/0299563 A1* | 10/2016 | Stafford | G02B 27/017 |
| 2017/0192401 A1* | 7/2017 | Wexler | G06K 9/6267 |

OTHER PUBLICATIONS

International Search Report and Written Opinion for International Application No. PCT/KR2017/007567, dated Oct. 25, 2017. (11 pages).

European search report, dated Apr. 10, 2019.

\* cited by examiner

1400

AUGMENTED REALITY DEVICE AND OPERATION THEREOF

CROSS-REFERENCE TO RELATED APPLICATIONS

This application claims the benefit of U.S. Provisional Patent Application No. 62/362,751 filed on Jul. 15, 2016, U.S. Provisional Patent Application No. 62/448,339 filed on Jan. 19, 2017, U.S. Provisional Patent Application No. 62/448,325 filed on Jan. 19, 2017, and U.S. Provisional Patent Application No. 62/472,497 filed on Mar. 16, 2017, all of which are fully incorporated herein by reference.

TECHNICAL FIELD

Embodiments of the present invention relate generally to augmented reality (AR) and, more particularly, to a device that provides enhanced user experience utilizing AR technology based on contextual information.

BACKGROUND

AR refers to a real-world environment modified by digital data. For example, AR technology may mix computer-generated imagery (CGI) into an observable visual field of a user, which may be achieved with: 1) heads-up displays allowing the CGI to be projected onto a partially transparent display surface such as glasses or goggles worn by the user, and/or 2) conventional display surfaces, such as tablet or smartphone screens, showing a live camera signal combined with CGI.

AR is quickly making its way into the mainstream. It can be deployed in a variety of areas including entertainment, education, health, and industrial production. Nonetheless, many people are reluctant to acquire and/or wear additional new hardware. Further, general adoption of an AR solution requires compelling content tailored to the environment, the context and the user. Therefore, to bring AR solutions to consumers, there are still enormous challenges that require solutions including new types of interaction models and enhanced connected services.

SUMMARY

An embodiment may include a device. The device may include a camera, a processor and an interface circuitry. The camera may be configured to capture a live image comprising an image of an object. Using the live image data. The processor, coupled to the camera, may be configured to recognize content of a selected portion of the live image and to generate visual information based on the recognized content. The interface circuitry, coupled to the processor, may be configured to overlay the live image with the visual information.

An embodiment may include a method of image processing. The method may include presenting, at an interface of a device, a live image data captured by a camera coupled to the device. The method may include recognizing, by a processor of the device and using computer vision technology, content of a selected portion of the live image data, and generating, by the processor, a visual information based on the recognized content. The method may include overlaying the live image data with the visual information.

A computer readable storage medium having program code stored thereon. The program code may be executable by a processor to perform a method. The method may include presenting, at an interface of a device, a live image data captured by a camera coupled to the device. The method may include recognizing, by a processor of the device and using computer vision technology, content of a selected portion of the live image data, and generating, by the processor, a visual information based on the recognized content. The method may include overlaying the live image data with the visual information.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments of the present invention; however, the accompanying drawings should not be taken to limit the present invention to only the embodiments shown. Various aspects and advantages will become apparent upon review of the following detailed description and upon reference to the drawings.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to AR and, more particularly, to a device that provides a virtual content layer, based on contextual information, to augment a user's observable visual field of real-world objects. In accordance with the inventive arrangements disclosed herein, a device is provided that is able to support visualization based on contextual information (for example, geo location) related to the device to enhance user experience. The visualization provided by the device may be constructed based on data coming from services utilizing the contextual information. Further aspects of the inventive arrangements will be described in greater detail with reference to the drawings below.

The inventive arrangements described herein may be implemented as a method or process performed by a data processing system. In another aspect, the inventive arrangements may be implemented as an apparatus such as a data processing system having a processor. The processor, upon executing program code/instructions, may perform one or more operations described herein. In still another aspect, the inventive arrangements may be implemented as a non-transitory computer-readable storage medium storing program code/instructions that, when executed, causes a processor and/or a system to perform and/or initiate a method or process.

Figure 1:
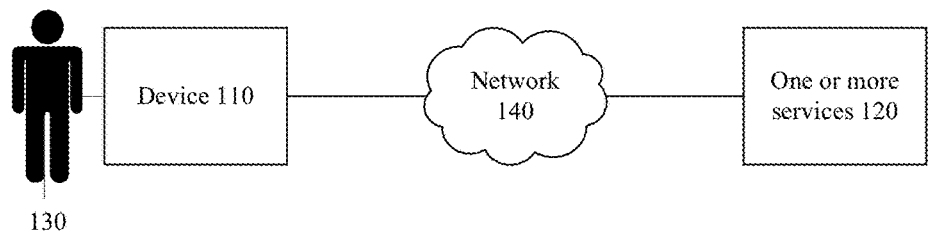
FIG. 1 is a block diagram illustrating an exemplary system that supports the enhanced AR experience.

FIG. 1 is a diagram illustrating an exemplary system 100 that supports an enhanced AR experience. As pictured, system 100 may include a device 110, and one or more services 120. For purposes of description, device 110 is associated with a user 130, and presents enhanced AR experience for user 130 based on data from the one or more services. In one embodiment, one or more services 120 do not reside in device 110, but may be communicatively linked with device 110 through a network 140. Authentication and verification process may be required to establish communications links between device 110 and one or more services 120. Device 110 and one or more services 120, may be implemented as data processing systems executing suitable software such as an operating system and one ore more other computer programs and/or operations. Device 110 may be implemented as any of a variety of electronic devices. Exemplary implementations of device 110 may include, but are not limited to, communication devices, mobile phones, tablet, smart portable or wearable devices, etc. In one embodiment, one or more services 120 maybe implanted among multiple data processing systems in a distributed environment. In another embodiment, one or more services 120 may be integrated into one data processing system. In yet another embodiment, one or more services 120 may be implemented as one or more applications operating on device 110.

Network 140 is the medium used to provide communications links among various devices and data processing systems within system 100. Network 140 may include connections, such as wire, wireless communications links, or fiber optic cables. Network 140 can be implemented as, or include, any of a variety of different communications technologies such as a WAN, a LAN, a wireless network, a mobile network, a Virtual Private Network (VPN), the Internet, the Public Switched Telephone Network (PSTN), or the like. It should be appreciated that device 110 and one or more services 120 may be coupled to or linked with network 140 through a wireless connection, a wired connection, and/or a combination of wireless and wired connections.

Device 110 and one or more services 120 may be grouped/associated together to enable more efficient augmentation. Association/Grouping may be determined at or around the time of manufacture of device 110 or thereafter and prior to availability (e.g., sale) to a user such as user 130. Once device 110 is powered on, it may join network 140 and is capable of establishing a communications link with one or more services 120 over network 140, without additional setup or configuration process. Association/Grouping may be further configured, during operation of device 110, by adding, editing and/or removing service(s). It should be appreciated that device 110 may be manually configured to be associated/grouped with one or more services 120. Device 110 and the one or more services 120 may further become associated/grouped based on contextual information. Such association/grouping, as described in more details hereafter, allows device 110 to provide context based enhanced AR, utilizing data received from the associated service, in a more natural and effective manner.

Figure 2:
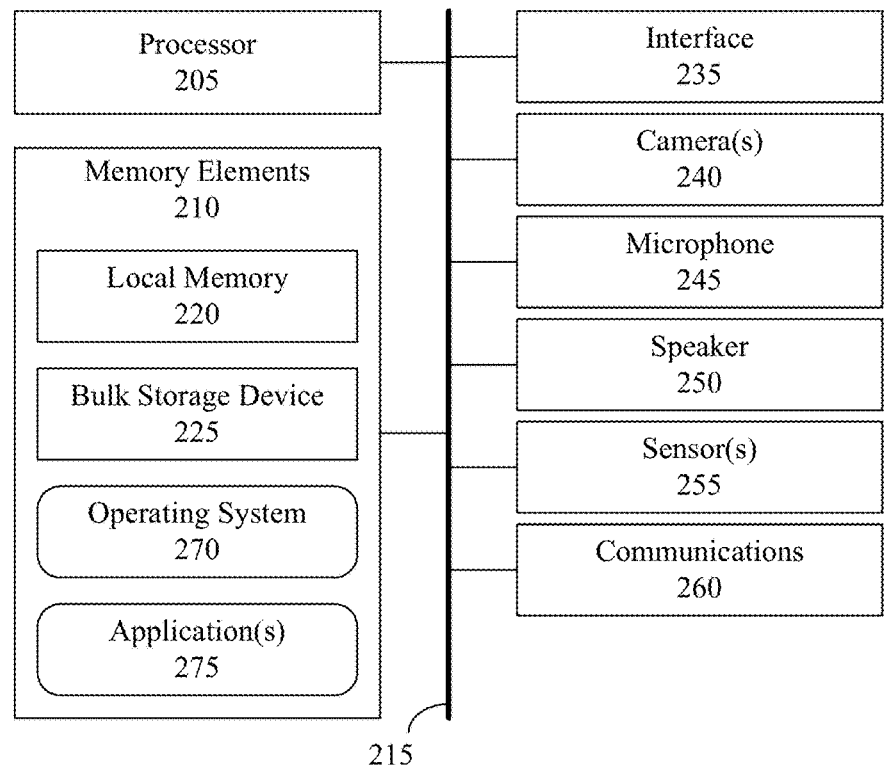
FIG. 2 is a block diagram illustrating an exemplary architecture of a device that supports the enhance AR experience.

FIG. 2 is a block diagram illustrating an exemplary architecture 200 of a data processing system, such as device 110 shown in FIG. 1. As pictured, architecture 200 includes at least one processor, e.g., a central processing unit (CPU) 205 coupled to memory elements 210 through a system bus 215 or other suitable circuitry. Architecture 200 may store program code within memory elements 210. Processor 205 may execute the program code accessed from memory elements 210 via system bus 215. Memory elements 210 may include one or more physical memory devices such as, for example, a local memory 220 and one or more bulk storage devices 225. Local memory 220 refers to random access memory (RAM) or other non-persistent memory device(s) generally used during actual execution of the program code. Bulk storage device 225 may be implemented as a hard disk drive (HDD), solid state drive (SSD), or other persistent data storage device. Architecture 200 may also include one or more cache memories (not shown) that provide temporary storage of at least some program code in order to reduce the number of times program code must be retrieved from bulk storage device 225 during execution.

Architecture 200 may include one or more input/output (I/O) devices. The I/O devices may be coupled to architecture 200 either directly or through intervening I/O controllers. For example, the I/O devices may include an interface circuitry 235, one or more cameras 240 or other image input circuitries, one or more microphones 245 or other audio input transducer(s), one or more speakers 250 or other audio output transducer(s), and one or more additional sensors 255. In one aspect, interface circuitry 235 may be a touch sensitive screen that may detect user touches and/or stylus contact. Exemplary sensor(s) 255 may include, but are not limited to, a Global Positioning System (GPS) receiver, an accelerometer, a gyroscope, a Radio-frequency Identification (RFID) reader, a light sensor such as an ambient light sensor or other optical electronic device, biometric sensor such as a finger print reader, a iris scanner, or the like. The light sensor may be implemented as camera(s) 240 or as a separate and independent sensor. In one embodiment, camera(s) 240 may have at least one camera facing the front of device 110 and at least one camera facing the back of device 110.

The I/O devices may also include communications circuitry 260 including, but not limited to, a network adapter and/or a wireless network adapter. Communications circuitry 260 may also be coupled to architecture 200 to enable architecture 200 to become coupled to other systems, computer systems, remote printers, and/or remote storage devices through intervening private or public networks. Modems, cable modems, and Ethernet cards are examples of different types of communications circuitry 260 that may be used with architecture 200. Wireless radios such as long range transceivers (e.g., mobile transceivers) and short range transceivers (e.g., Bluetooth compatible transceivers, 802.11x compatible transceivers, etc.) are also examples of communications circuitry 260 that may be included. In some cases, one or more of the I/O devices may be combined as in the case where a touch sensitive screen is used as a display device.

Architecture 200 may include a power source including but not limited to, a power supply intended to plug into an outlet or other electrical connector, a power supply receiving energy through wireless charging (e.g., electromagnetic induction), a battery, or both a battery and a power source that may also be configured to charge the battery. For ease of illustration, the power source is not illustrated in FIG. 2.

As pictured in FIG. 2, memory elements 210 may store an operating system 270 and one or more applications 275. For example, one or more applications that either interact with or implement one or more services 120 may be stored within memory elements 210. In one aspect, operating system 270 and application(s) 275, being implemented in the form of executable program code, are executed by architecture 200, i.e., by processor 205. As such, operating system 270 and application(s) 275 may be considered an integrated part of architecture 200. Operating system 270, application(s) 275, and any data items used, generated, and/or operated upon by architecture 200 are functional data structures that impart functionality when employed as part of a system implemented using architecture 200.

Architecture 200 may be used to implement any of a variety of systems and/or devices that include a processor and memory and that are capable of performing the operations described within this disclosure. For example, architecture 200 may be used to implement any of a variety of different devices such as device 110, and one or more services 120. In some cases, the particular device implemented using architecture 200 may include fewer components than shown or more components than shown. Further, the particular operating system and/or application(s) included may vary. In one exemplary implementation, architecture 200 may be used to implement device 110. In that cases, application(s) 275, when executed, may implement the AR operations described herein such as capturing a live image, recognizing content of a selected portion of the live image based on contextual information, generating a visual information based on the recognized content, overlaying the live image with the visual information, and the like.

As described in this disclosure, the term "contextual information" may refer to environment, circumstances, situation, background, and/or conditions surrounding, associated with, relevant to or relating to a point of reference, such as device 110, a related object and/or user 130. Contextual information may be sensed by I/O devices of device 110. For example, visual data such as images and/or video captured by camera(s) 240, audio data captured by microphone 245, lighting condition, background noise, radio signal, and other sensor data (location, motion, biometric, odor or flavor data, etc.) detected and/or generated by sensor(s) 255. Contextual information may be data generated by applications of device 110, or retrieved from external and/or remote sources. For example, event data and activity data may come from Calendar application or social networks, weather data from Weather application or online weather service, contact data from Phone or Email applications or cloud storage of user 130, time data from Clock application or time servers, etc. Contextual information may be personal data of user 130, including but not limited to, activity history data, preference data, habit, etc. Contextual information may derive from crowd-sourced data from a group of people that situate similarly to or share commonality with user 130, demographic data, religious practice, culture background, etc.

In one embodiment, device 110 may provide an augmented virtual content layer by invoking one or more AR applications. In one embodiment, each AR application is individually operated, and may be invoked or activated by explicit interaction or in accordance with contextual information. In another embodiment, device 110 is configured to support a general AR application, and each individual AR application with more specific capability and/or functionality may be invoked or activated based on distinctive contextual information. For example, both AR application A and AR application B are capable of converting images into machine-encoded textual information. AR application A is able to provide information focusing on dining experience, while AR application B is able to provide information related to publication industry. In one embodiment, device 110 may determine its location based on contextual information. If it is determined that device 110 is at or close to a restaurant, AR application A may be invoked. If it is determined that device 110 is at or close to a library, AR application B may be invoked.

In one embodiment, one or more AR applications may be integrated with a conventional application. For example, a Camera App may include AR application A and AR application B as additional AR modes, which may be activated by a user interaction or based on contextual information, on top of modes such as "Auto," "Beauty face," "Night," and "Sports," etc. Such additional AR modes provide enhanced camera function and experience. In one aspect, one such additional AR mode is a restaurant experience mode, as a built-in feature of the camera function, to provide an enhanced restaurant experience within the Camera App.

Figure 3:
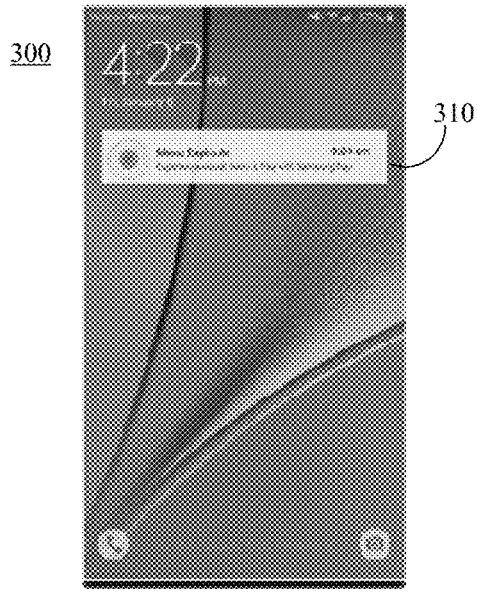
FIG. 3 is an exemplary graphical user interface (GUI) that may be presented at the device of FIG. 2.

In one aspect, when Camera App of device 110 is actively running in the frontend of device 110, restaurant experience mode may be triggered upon explicit selection. In another aspect, restaurant experience mode may be triggered in response to contextual information, without user interaction (e.g., when device 110 is locked, or when Camera App is passively running). FIG. 3 shows an exemplary display of a notification related to the restaurant experience mode at a lock screen user interface (UI) on device 110 of FIG. 2. While device 110 is locked pending user login, it has determined that it is located at or near a restaurant. Such determination may push notification 310 to be shown at the lock screen UI to alert user 130 of availability and features of "Menu ExplorAr," a restaurant experience mode that enables virtual menu and mobile payment options.

Figure 4:
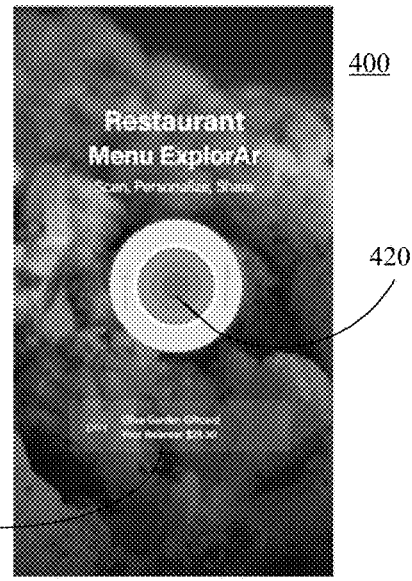
FIG. 4 is an exemplary GUI of an application that provides the enhance AR experience, where the GUI may be presented at a device of FIG. 2.

In one embodiment, the restaurant experience becomes a standalone application that may be individually and independently launched or activated on device 110, similar to applications such as Camera or Phone Apps. User 130 may launch restaurant experience application 502 or bring it from the backend to the frontend via various interactions with device 110, including but not limited to, voice input and/or gesture input. Restaurant experience application 502 may be triggered based on contextual information as well. A notification similar to the one shown in FIG. 3 may be displayed notifying availability and features of the standalone restaurant experience application 502, when it is determined that device 110 is located at or near a restaurant. Responsive to interaction with notification 310, restaurant experience application 502 may be activated, as illustrated in FIG. 4.

Figure 10:
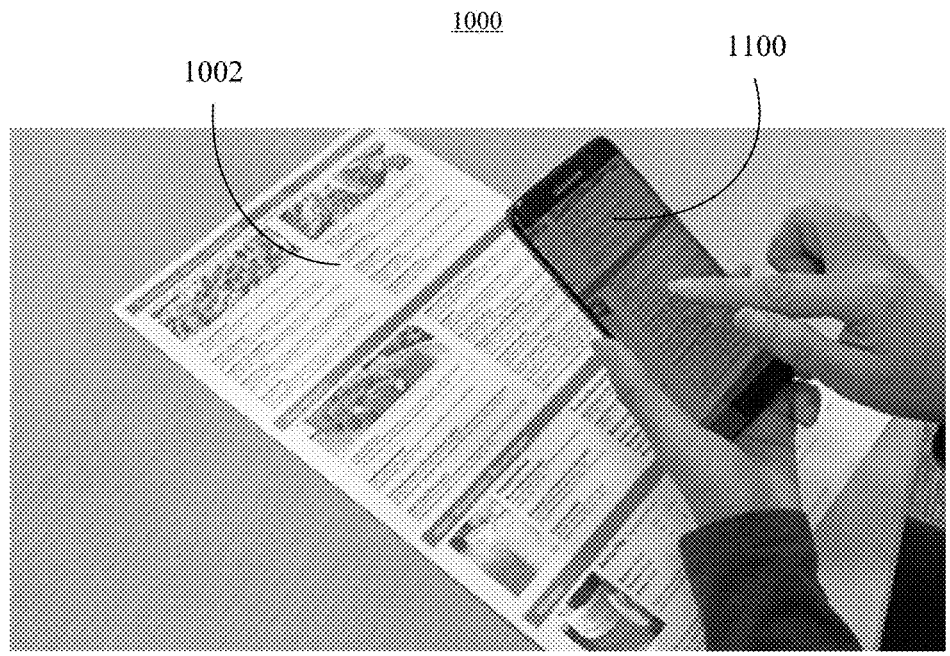
FIGS. 10-11, taken collectively, illustrate an example usage of the application of FIG. 3.

In one embodiment, restaurant experience application 502 may be associated with one or more services 120 shown in FIG. 1. Association with such service(s) may be based on the contextual information. For example, a previous associated service may become disassociated when it is determined that device 110 is at a location that the service hasn't secured an operation license. UI of restaurant experience application 502 may present data coming from an associated service. FIG. 4 illustrates UI 400 of "Restaurant Menu ExplorAr," an exemplary restaurant experience application. UI 400 includes indication 410, which highlights the availability of Samsung Pay™, an associated mobile payment service, that provides information of balance on an "Oliver Garden" gift card, when it is determined that user 130 is at or around restaurant Olive Garden™ and the present time is the usual lunch or dinner hours for that region or culture. UI 400 may also present logo 420 of "Restaurant Menu ExplorAr," which also functions as a control mechanism. Responsive to activation or selection of logo 420, UI 400 may change to a live camera view 1100, as illustrated in FIG. 10.

Figure 5:
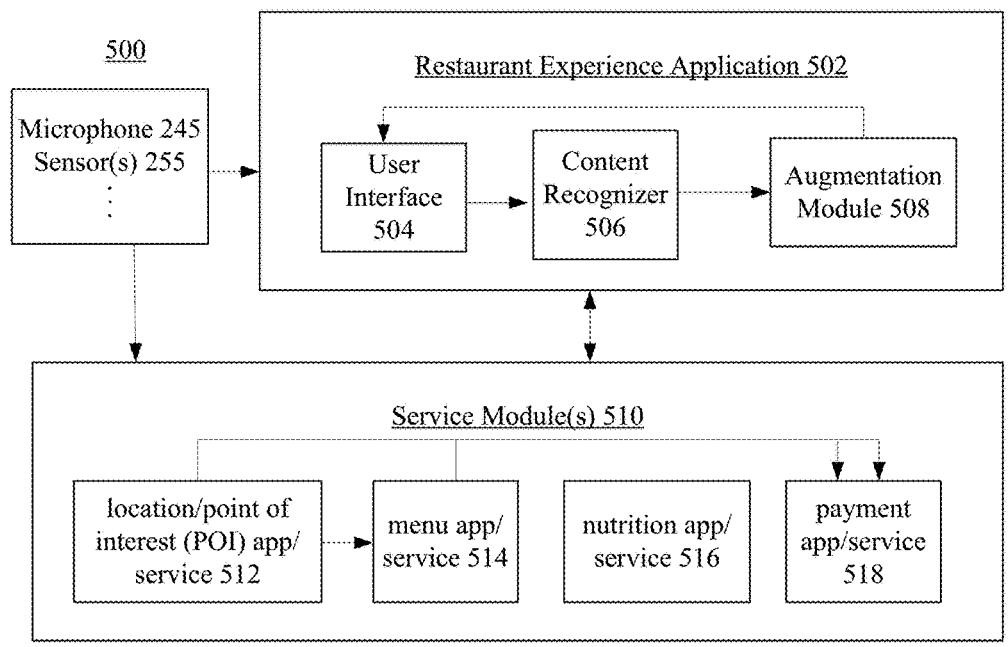
FIG. 5 is a block diagram illustrating example components of a system that supports functions of the application of FIG. 4.

FIG. 5 is a block diagram illustrating example components of system 500 that supports restaurant experience application 502. System 500 may be an exemplary implementation of application(s) 275 of FIG. 2, where architecture 200 is used to implement device 110 of FIG. 1. In one arrangement, system 500 comprises restaurant experience application 502, and service module(s) 510. Modules may implement processes and features described herein, and are executable, by data processing system such as device 110 and/or electronic circuitry, individually or collectively in a distributed computing environment. Modules may be realized by hardware, computer readable program instructions stored on a non-transitory computer readable storage medium, or a combination thereof. For example, one or more modules may comprise a plurality or series of instructions to be executed by a processor in a hardware system, such as processor 205. For another example, one or more modules may be executed by multiple processors or data processing systems.

In one aspect, restaurant experience application 502 includes UI 504, content recognizer 506, and augmentation module 508. Restaurant experience application 502 may support an open camera view function that allows capturing a live view using camera(s) 240 of device 110. Once launched, restaurant experience application 502 may present the live camera view via UI 504. In one aspect, a touch sensitive screen as interface 235 may be used to implement UI 504. It should be appreciated that the inventive arrangements described herein are not intended to be limited to a touch sensitive screen as other interface types, e.g., a non-touch graphical user interface, may be used as well. UI 504 may be configured to detect user interactions such as gesture inputs, including direct touches and the like (e.g., hover touches), input utilizing a tool (e.g., stylus), and translate the detected interactions into commands that are understandable by content recognizer 506. For example, UI 504 may display a live image of a restaurant menu, which is captured by camera(s) 240, and detect a selection of a portion of the live image as a result of user drawing a circle at UI 504. UI 504 may be further configured to detect a variety of pressure levels caused by user interactions, and translate the detected interactions reflecting the variety of pressure levels.

In one arrangement, content recognizer 506 performs content recognition, including text recognition, upon receipt of content selection command from UI 504, voice input from microphone 245, and/or information from sensor(s) 255. For example, content recognizer 506 is configured to recognize texts, such as name of a dish, from the selected portion of the live image provided by UI 504. In one arrangement, content recognizer 506 may perform content recognition upon receipt of information from other data processing systems or services coupled to device 110, via communications circuitry 260. For example, content that needs to be recognized may be captured by and shared from another device which is not equipped with content recognition functionality.

In one embodiment, content recognition is achieved using computer vision technology. Computer vision technology is an interdisciplinary technology that studies how to reconstruct, interpret, and understand a 3D scene from 2D digital images or videos. Computer vision overlaps with the fields of machine learning (pattern recognition) and image processing (image compression, restoration, enhancement, etc.). The ultimate goal of computer vision is to model, replicate, and exceed human vision using computer software and hardware at different levels. For example, low-level computer vision involves processing image for feature extraction (edge, corner, optical flow, etc.). Middle-level computer vision involves object recognition, motion analysis, and 3D reconstruction using features obtained from the low-level vision. High-level computer vision involves interpretation of the evolving information provided by the middle-level vision and directing what middle- and low-level vision tasks should be performed. Interpretation may include conceptual description of a scene like activity, intention, and behavior. Example applications of computer vision technology include robotics, medicine, security, transportation, industrial automation, image/video databases, and human computer interface.

In one embodiment, content recognizer 506 requires information from service module(s) 510 to improve content recognition accuracy and/or performance speed. For example, upon receipt of content selection, content recognizer 506 may be configured to receive digital representation of a physical menu from menu app/service 514 to assist recognition of the content selection as the name of an entry provided in the digital representation.

In one embodiment, recognized content becomes digital data that may be further processed by or with other components of system 500. For example, recognized content may be communicated with service module(s) 510 to obtain additional information. In one arrangement, the recognized entry name may be passed on to augmentation module 508, nutrition app/service 516, and/or payment app/service 518. For example, content recognizer 506 may be configured to share the name of the recognized entry to nutrition app/service 516 for retrieving nutrition breakdowns of the entry.

Augmentation module 508 may generate augmented information, which is graphical visual representation of the additional information received from service module(s) 510, recognized content received from content recognizer 506, and/or the contextual information coming from the I/O devices (e.g., camera(s) 240, microphone 245, sensor(s) 255, etc.). For example, augmentation module 508 may be configured to present a dish picture mapped to the recognized name of the entry. Augmentation module 508 may follow pre-defined rules, industrial practices, UI layout or presentation style templates defined as system default, configured by user 130, guidance provided by $3^{rd}$ parties, and/or preference of user 130 based on learned pattern or user history, to construct graphical elements of the additional information. UI 504 may be further configured to display the augmented information by providing a virtual content layer to support overlaying the live camera view with the augmented information.

Service module(s) 510 may comprise one or more services 120 of FIG. 1. Service module(s) 510 may interact with restaurant experience application 502 by receiving/providing data from/to restaurant experience application 502, directly or via network 140 of FIG. 1. In one embodiment, restaurant experience application 502 may cause the contextual information to be input to service module(s) 510.

In one aspect, system 500 implements a plug-in architecture in which additional service modules may be added or incorporated, statically or dynamically. The particular operations that may be performed by service modules 512-518 will be described in greater detail herein. Since service module(s) 510 may be implemented as executable program code, the various operations described herein attributable to one or more of service module(s) 510 may be performed by a processor, or processors, executing the program code of one or more of the respective service module(s) 510.

In one arrangement, service module(s) 510 may include location/point of interest (POI) app/service 512, menu app/service 514, nutrition app/service 516, and payment app/service 518. In one embodiment, restaurant experience application 502 may cause sensor data, and/or contextual information determined based on the sensor data to be passed to service module(s) 510. In one embodiment, service module(s) 510 is configured to interface with and control I/O devices including sensor(s) 255 for sensor data capture. Sensor data herein include data captured by various I/O devices illustrated in FIG. 2 and is not limited to data only detected or captured by sensor(s) 255. Service module(s) 510 processes received sensor data and/or recognized content shared from content recognizer 506, and return additional information, such as restaurant data, digital representation of the physical restaurant menu, nutrition information of a recognized menu entry, and payment information related to an ordered menu item, to restaurant experience application 502. Such additional information may be visualized by augmentation module 508 to formulate augmented information to be displayed via UI 504.

In one embodiment, location/POI app/service 512 is configured to receive sensor data to further synthesize one or more particular items of sensor data to derive contextual information. For example, it may utilize geo coordinates to determine a location, a POI, a business, etc. Location/POI app/service 512 may consult a database, which is stored on device 110, for the mapping from geo coordinates to a restaurant. Location/POI app/service 512 may query a service not local to device 110 for such information as well. The contextual information may be communicated to restaurant experience application 502 or other modules of service module(s) 510.

One or more services 120 may exchange data among themselves, or additional information provided by one service may be passed to another service as input, via restaurant experience application 502.

In one embodiment, menu app/service 514 is configured to provide a digital representation based on sensor data and/or contextual information received from I/O devices of device 110, location/POI app/service 512, and/or restaurant experience application 502. An exemplary operation may include contacting the restaurant, based on information shared from location/POI app/service 512, to retrieve a digital menu of the restaurant. Menu app/service 514 may reach out to a third-party service (e.g., OpenMenu™, restaurant critic services, etc.) for the digital menu, and contact information of the third party may be system pre-defined or entered by user 130. Menu app/service 514 is configured to share the digital menu with content recognizer 506 to further determine a particular entry identified by user 130. In one embodiment, menu app/service 514 receives menu information and constructs a digital menu as a full list of menu items according to the received menu information. Menu app/service 514 may also formulate the digital menu in a style or format desired or requested by content recognizer 506.

Figure 13:
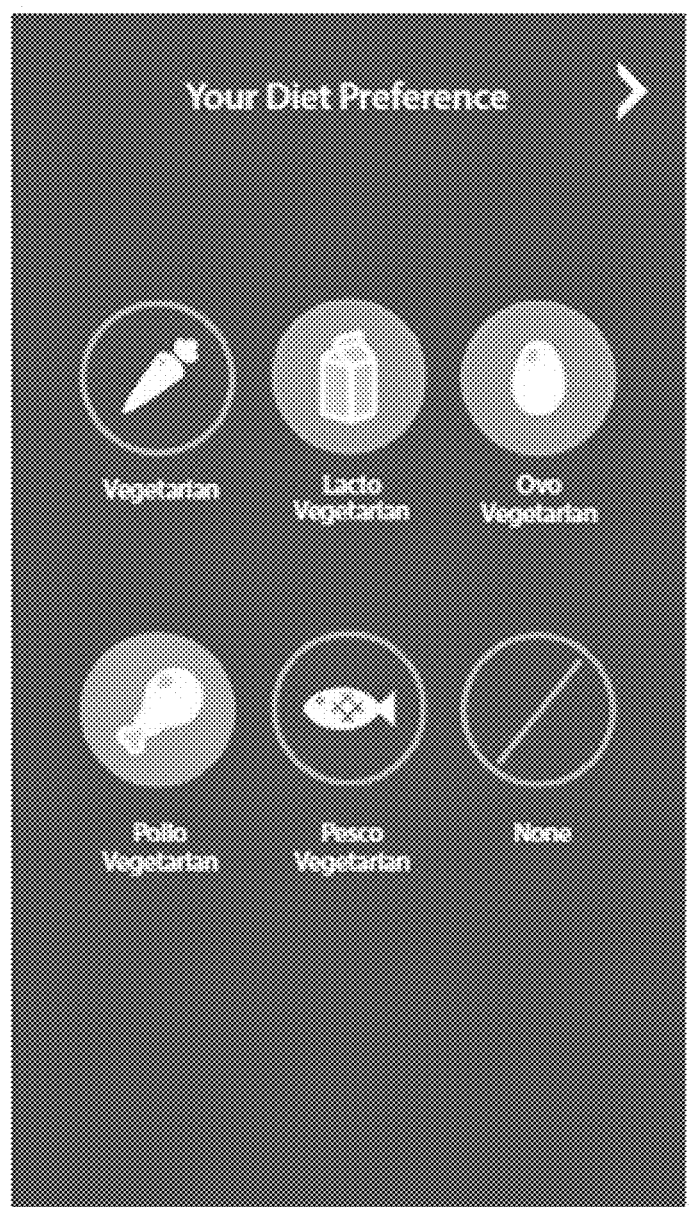
FIGS. 13-14, taken collectively, illustrate an exemplary GUI for getting personal information.
Figure 14:
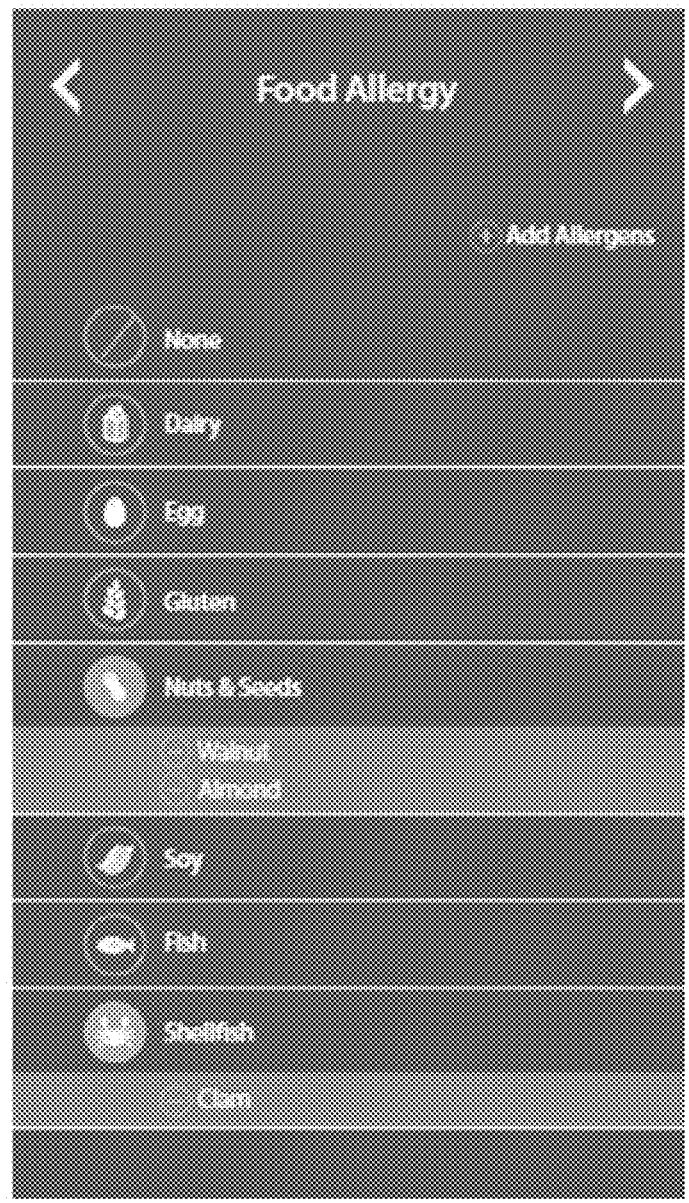

In one embodiment, nutrition app/service 516 is configured to provide a series of nutrition information such as percentages of calorie, fat, carb, protein, cholesterol, etc., based on recognized menu entry received from content recognizer 506. In one embodiment, nutrition app/service 516 may provide additional data specific to user 130, based on personal information. FIGS. 13 and 14 illustrates examples of personal information entered by user 130.

In one embodiment, payment app/service 518 is configured to enable payment processing of the item ordered by user 130. Identification of the ordered item may be received from content recognizer 506. Data associated with payment processing, including but not limited to membership, reward, discount and/or promotions, etc., may be sent from payment app/service 518 to augmentation module 508 to be presented to user 130. In one embodiment, payment app/service 518 may be configured to receive a digital menu from menu app/service 514 to determine the price of the ordered item. In one embodiment, payment app/service 518 may be configured to contact the restaurant, based on information shared from location/POI app/service 512, to receive a bill for user 130.

Figure 11:
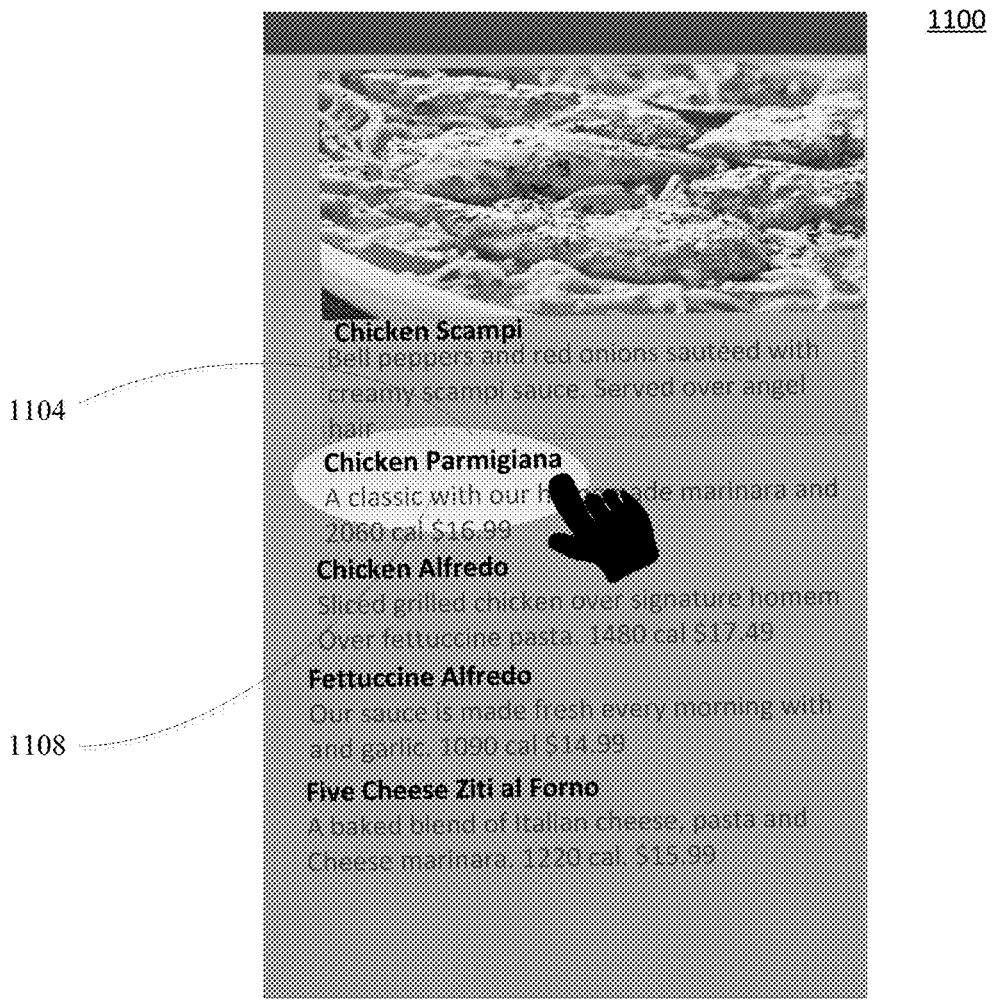
Figure 12:
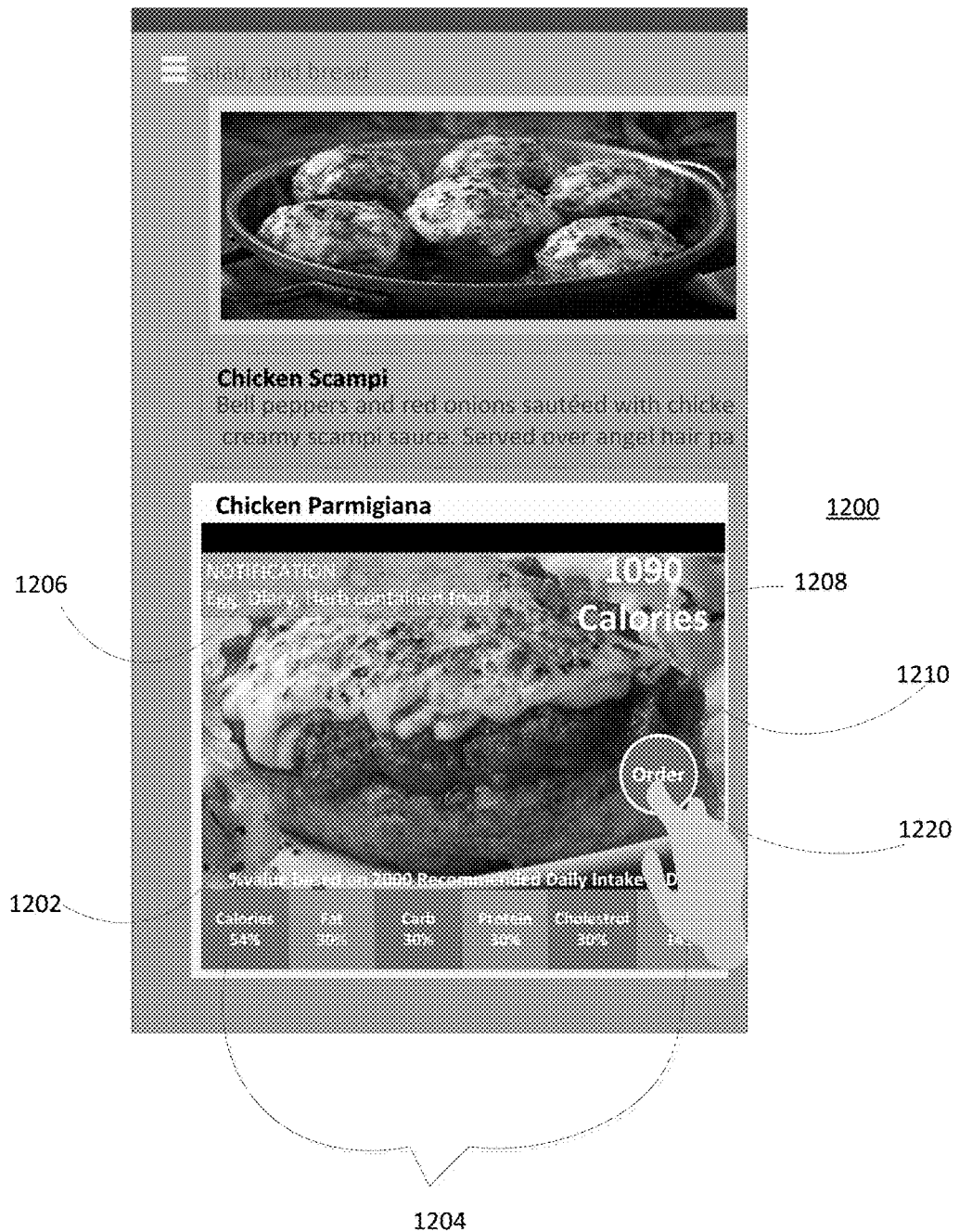
FIG. 12 is an exemplary GUI of augmentation presented by the application of FIG. 3.

FIG. 10 illustrates an exemplary usage of restaurant experience application 502. User 130 positions her device, which implements system 500, over printed menu 1002 of a restaurant. Restaurant experience application 502 is activated. A live view of printed menu 1002 is presented as visual content 1100 at the display interface of her device. FIG. 11 shows an exemplary interaction with visual content 1100. FIG. 12 demonstrates an exemplary display 1200 of device 110 implementing system 500, where visual content 1100 is overlaid with a layer of augmented information 1210.

Figure 6:
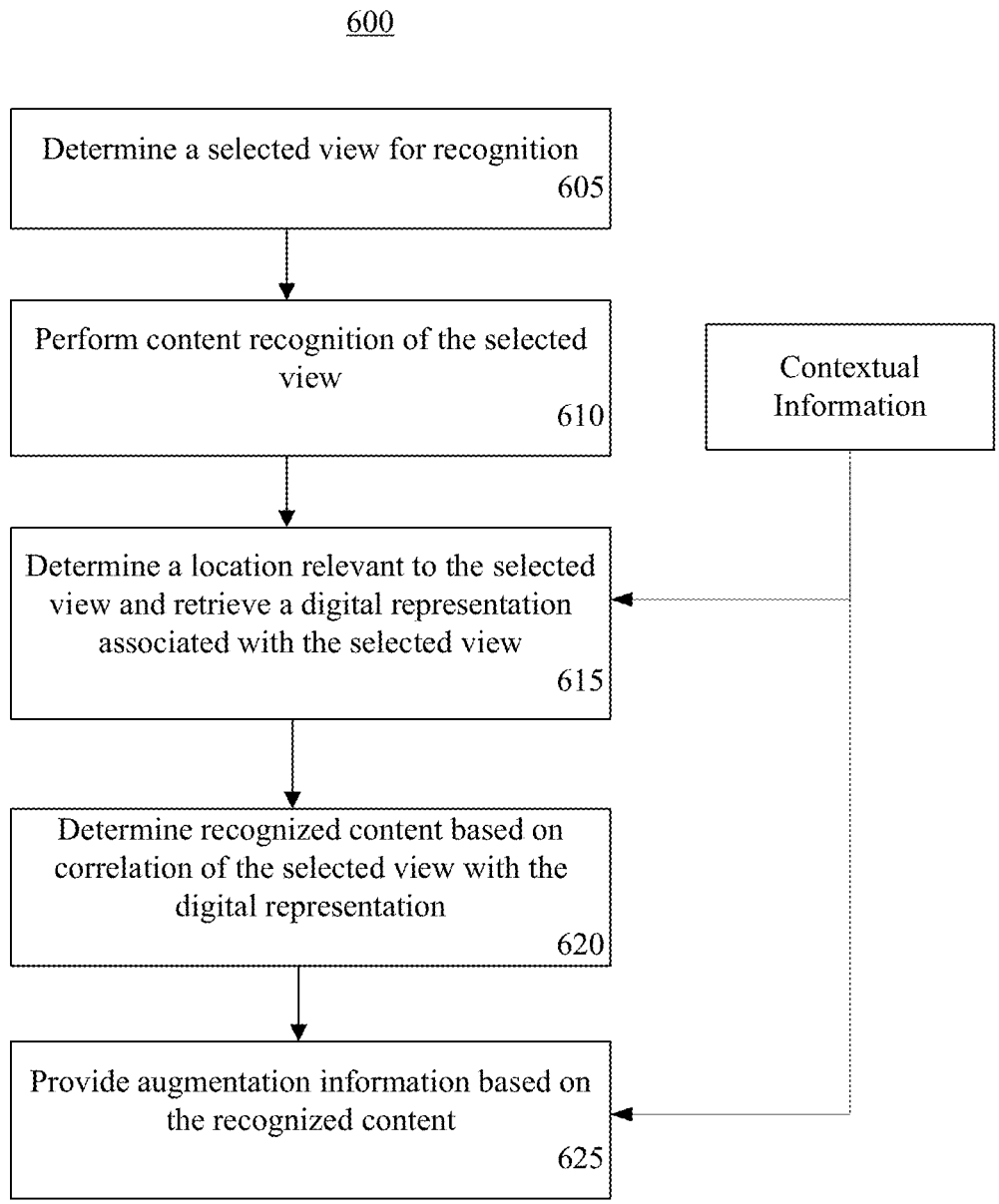
FIG. 6 is a flow chart illustrating an example method of providing augmentation based on contextual information.

FIG. 6 is a flow chart illustrating an example method 600 of providing augmentation based on contextual information. Method 600 may be implemented by a data processing system such as device 110 of FIG. 1 with architecture 200 of FIG. 2. Method 600 may begin in block 605 where a portion or an area of UI 504 supported by device 110 is selected for content recognition. In one embodiment, UI 504 includes live image data, which comprises an image of an object, captured by device 110. In one aspect, device 110 running restaurant experience application 502 determines that content recognition will be performed for the overall visual content 1100 shown in FIG. 11. In one aspect, UI 504 detects an interaction that indicates one or more portions of visual content 1100 are selected for content recognition, and content recognition may be triggered in response to the interaction. Method 600 may begin in block 605 when device 110 receives information with respect to a selected view, where the selection is performed by another device. For example, user A may be at a restaurant looking at a physical menu. However, user A's device is not capable of running content recognition or providing augmented information. User A may send her selected view of the physical menu to user B, whose device implements architecture 500.

User B can share the augmented information with user A via messaging, email, call or video call.

In illustration, user 130 may interact with visual content 1100 to select a portion. Such an interaction may be achieved via a variety of input measures. For example, user 130 may encircle a portion of visual content 1100 on interface circuitry 235 using finger(s) or stylus, as illustrated in FIG. 11, to identify selected view 1104. For another example, user 130 may use multiple fingers or input means to identify boundary of an area of visual content 1100 to form selection view 1104. A predefined shape may be employed to form the selection, with its size determined relatively to the positions of the fingers or the input means. For yet another example, selection may be determined based on other means (e.g., when user zooms in, tap-and-hold a specific word or phrase, or tracking the eye focus of user 130 to estimate in which portion of visual content 1104 the user is interested, etc.).

In one embodiment, selected view 1104 is visually distinguished from the non-selected view of visual content 1100. For example, selected view 1104 may be highlighted, and/or having the outline surrounding the selected portion highlighted, etc. Visual distinction may be achieved by deploying different visual styles, including but not limited to color, textual appearance, shade, or shape effects, etc.

In block 610, content recognition may be triggered to recognize the content included within selected view 1104. Content included may comprise textual content, or a combination thereof. In one embodiment, computer vision technique may be implemented to perform content recognition. For example, for textual content, optical character recognition (OCR) is utilized to convert the textual content to machine-encoded texts. In one embodiment, user 130 may be prompted for language selection before OCR is performed. In another embodiment, restaurant experience application 502 may follow a pre-defined or default order of language selections to perform OCR until user 130 confirms or accepts the OCR output. In yet another embodiment, restaurant experience application 502 may determine to use an official language or local dialect based on contextual information relevant to printed menu 1002. For example, the relevant contextual information may include geo location of the captured object, where geo location data is sensed by I/O devices coupled to device 110 or retrieved from other source(s). If the geo location is determined to be within the United States, English may be used to carry out OCR, while French may be used when the geo location is determined to be within Quebec, Canada.

In one embodiment, selected view 1104 may be pre-processed, using methods such as pixel converting, image binarization, etc., to be more suitable for OCR thus to improve the accuracy of OCR result.

In another embodiment, content recognition may be triggered without determination of selected view 1104. For example, content recognition may be constantly performed for the overall visual content 1100 captured in the live view.

In one embodiment, pose tracking may be employed to determine position and orientation of device 110 with respect to printed menu 1002 for enhanced content recognition. A camera pose may be computed using tracking by detection or tracking by matching, where an input image is matched with a reference using a detection technique, without using previous pose information. A camera pose may also be computed using frame-by-frame tracking or recursive tracking, wherein its previous pose information is used. These approaches help minimization of camera displacement between two successive images. In one embodiment, data captured by sensor(s) 255 (e.g. inertial measurement unit, accelerometer, gyroscope, etc.) of device 110 may be used to determine acceleration and rotational speed of camera(s) 240, as a complementary technology to the visual approach, in order to infer the traveled trajectory of device 110. For example, pose tracking may provide better aligned image to content recognizer 506 to facilitate content recognition, such as OCR, by adjusting image distortions caused by tilting or rotation of device 110.

In one embodiment, during post-processing phrase of OCR, OCR accuracy may be increased by constraining output by an application-specific lexicon comprising food items, dish names and diet options. In another embodiment, OCR may be tuned to achieve better performance by considering restaurant industry standard expression.

In block 615, a location relevant to selected view 1104 is determined and a digital representation associated with selected view 1104, based on the location, may be retrieved. Location/POI app/service 512 illustrated in FIG. 5 may be implemented to perform determination of the relevant location. In one embodiment, upon determination of selected view 1104, restaurant experience application 502 further determines a restaurant that is relevant to selected view 1104. Relevance may be determined based on contextual information, such as geo location. For example, device 110 may obtain corresponding address based on geo coordinates information sensed by a GPS receiver. Device 110 may identify a restaurant business at the address, either based on a database maintained on device or through a third-party service. Relevance may be determined based on radio data. For example, a restaurant may provide, at the front desk/reception area, a poster that contains a RFID tag. Device 110 may detect the RFID tag via a coupled RFID reader to identify the restaurant at which user 130 is in. For another example, a restaurant may be determined based on the identification of an access point (e.g., network name of a Wi-Fi access point) available to device 110. In one embodiment, when more than one restaurants are located at or near the address, a list of these restaurants may be presented to user 130 so that she can identify which restaurant she will enter. In one embodiment, when there are multiple restaurants at the address, device 110 may narrow down relevance determination based on religion of user 130. For example, restaurant A serving Halal food is determined over restaurant B when user 130 is a Muslim, while restaurant B serving Kosher is determined over restaurant A when user 130 is Jewish.

Device 110 may optionally categorize the contextual information. For example, device 110 may categorize audio data on a scale indicating the sound level. Device 110 may further categorize the type of audio data. Exemplary types of audio may include, but are not limited to, music, voices of users, or the like. Device 110 may also identify the language used in the voices of users. Restaurant may be determined based on the audio data. For example, when restaurant A serving Indian food is right next to restaurant B serving Chinese food, restaurant A may be identified when device 110 detects that Mandarin is dominant in the audio data. Restaurant may also be determined based on correlation of contextual information. For example, for the above described two restaurants scenario, restaurant A may be identified when device 110 finds a calendar event entered by user 130 revealing that she will have a lunch meeting with a colleague at restaurant A, and device 110 also determines that the present time is noon.

In one embodiment, user 130 may be ordering to go items using device 110 with a restaurant physical menu, at a location different from where the restaurant is located. When restaurant experience application 502 cannot determine a restaurant business at or near where device 110 is located, a restaurant may be determined based on user history data such as past restaurant visits of user 130. User history data may be stored on device 110 or may be retrieved from a cloud based service. The restaurant determination, for this case, may further correlate present time with calendar event data. For example, if user 130 visits restaurant A mostly during lunch hour and restaurant B often for dinner, and the present time is 1 PM, restaurant A may be identified as the restaurant that is associated with printed menu 1002. For another example, if user 130 has identified an event in her calendar to invite her friends for Indian foods at 1:30 PM, restaurant B may be identified anyway when restaurant B servers Indian food and restaurant A servers Mediterranean food. In one arrangement, one or more restaurants may be determined by searching for restaurants within a range limit of the geo location of device 110.

In one embodiment, restaurant experience application 502 may retrieve a digital representation associated with selected view 1104, based on the determined restaurant. The digital representation may be a digital version of the physical menu. In one embodiment, the digital representation may have a complete different visual presentation from printed menu 1002. In one embodiment, when more than one restaurants are determined to be relevant to selected view 1104, a digital menu may be retrieved for each one of the restaurants. Menu app/service 514 illustrated in FIG. 5 may be implemented to perform this step.

In one embodiment, contextual information may be utilized to further narrow down the digital representation that may be retrieved. For example, some stores of a franchise or a chain may provide localized menu items. As defined within this disclosure, "a franchise or chain" is a legal entity such as a business or other establishment, whether for-profit or non-profit, having more than one branch. A "branch" is a physical place of the franchise or chain that conducts business or transactions with users or members of the public. Each branch operates under a common, or same, brand name. Examples of franchises or chains include restaurants with multiple branches, conveniences stores with multiple branches, retail stores with multiple branches, etc. If contextual information indicates a Kentucky Fried Chicken™ (KFC) restaurant in Beijing, China, restaurant experience application 502 may retrieve a local version menu that includes items such as egg and vegetable soup, zinger burger, chicken shrimp burger, which do not exist on KFC's menu in the United States.

In block 620, selected view 1104 may be recognized based on correlating selected view 1104 with the digital representation. Restaurant experience application 502 may perform Item Reconciliation to map the machine-encoded text to the corresponding item listed in the digital representation.

Figure 7:
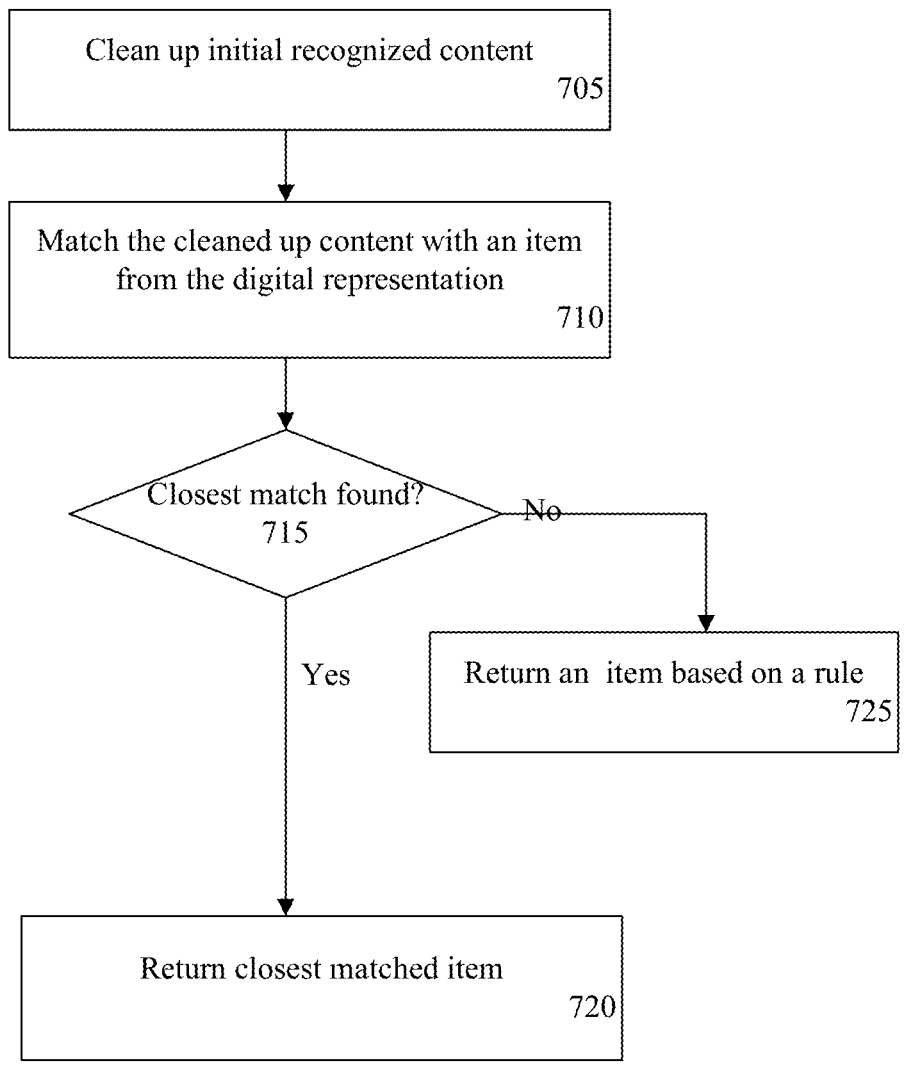
FIG. 7 is a flow chart illustrating an exemplary method of Item Reconciliation.

FIG. 7 is a flow chart illustrating an exemplary Item Reconciliation process. In block 705, initial recognized content, which is recognized in block 610 of selected view 1104, is cleaned up by splitting text blocks into individual lines, and removing garbage characters and redundant whitespaces. The clean-up process facilitates a better matching of the recognized content to the corresponding digital content. In block 710, a matching algorithm is performed to match the cleaned up content with an item from the digital representation. In one embodiment, block 710 finds the closest match of menu items by calculating the Levenshtein distance (a string metric for measuring the difference between two sentences) between the cleaned up content and the digital representation. If a closest match is found in block 715, the matched menu item is returned as the final recognized content of selected view 1104 in block 720. If a closest match is not found, a menu item is determined based on a rule. In one embodiment, the rule may determine to return the first menu item of the digital menu, a menu item with the highest price, a most popular menu item, or a menu item that matches to personal data of use 130.

In one embodiment, block 615 may be performed prior to block 610 to improve OCR accuracy by constraining output of content recognition with lexicon specific to the digital menu of the identified restaurant.

In one embodiment, after Item Reconciliation, selected view 1104 may be recognized as recognized content 1108 (e.g., a particular menu item). In block 625, for recognized content 1108, restaurant experience application 502 may provide augmentation based on recognized content 1108. In one arrangement, additional information may be obtained and/or created to generate the augmented information, which is a visual representation of the additional information. Visual content 1100 may be overlaid with the augmented information. The additional information may come from associated services that identify ingredients, nutrition facts of recognized content 1108, process payment transaction associated with recognized content 1108, provide a photo or video of recognized content 1108, etc.

In one embodiment, the associated service(s) may include designate application(s) operating on device 110, or being remotely accessible via network 140. In another embodiment, the additional information is obtained from crowd-sourced data such as online reviews, critics, social networks, etc.

Figure 8:
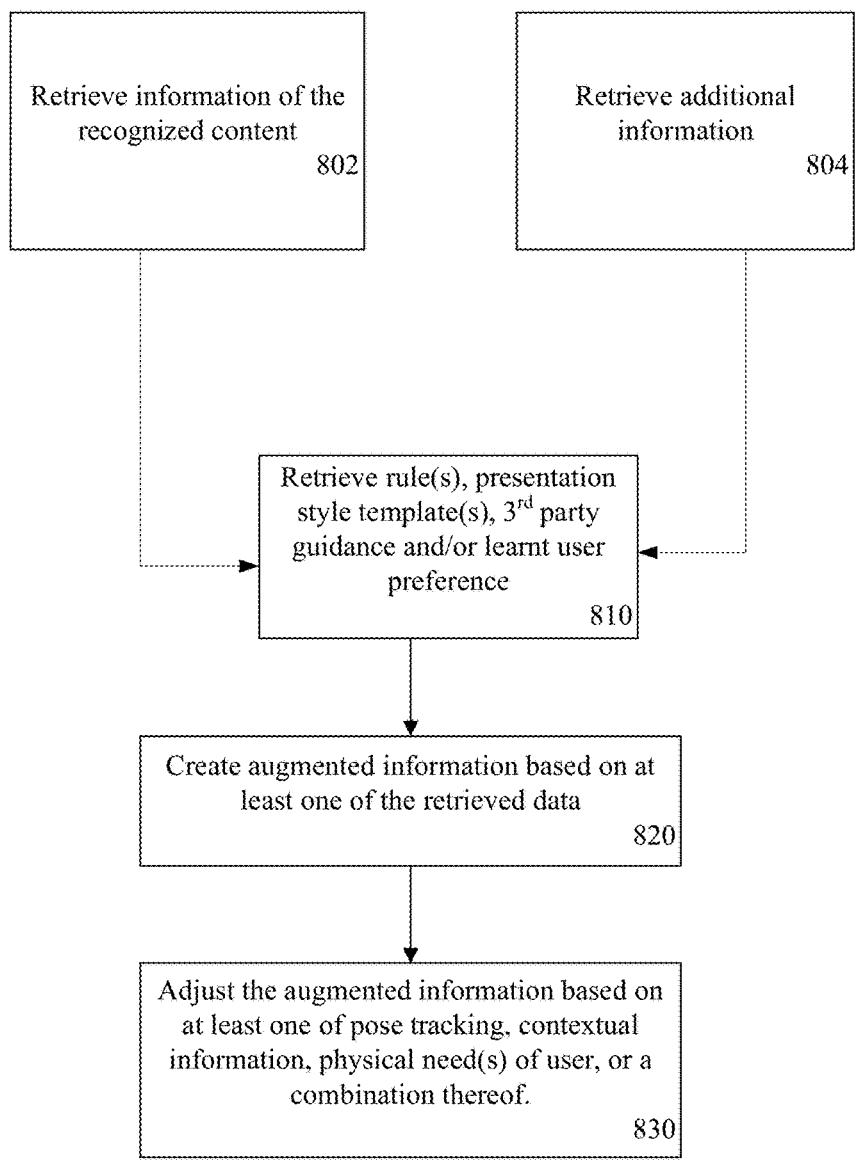
FIG. 8 is a flow chart illustrating an exemplary method of Item Enhancement.

In one embodiment, Item Enhancement may be performed to create augmented information 1210 illustrated in FIG. 12. FIG. 8 is a flow chart illustrating the details of Item Enhancement process. In block 802, information of recognized content 1108 may be retrieved such as one or more graphical images of the recognized selected menu item. In block 804, additional information may be retrieved. The additional information will be described in further details below. In block 810, rule(s), presentation style template(s), pre-defined or determined by user 130, guidance provided by $3^{rd}$ parties, and/or learnt preference of user 130, may be retrieved to formulate graphical elements of augmented information 1210 and to integrate augmented information 1210 with further services such as payment app/service, etc. For example, learning that user 130 cares the most about calorie intake, such information may always be highlighted and displayed at the top. In one embodiment, the rule(s) and/or presentation style template(s) may be specific to the category or type of additional information. For example, nutrition breakdowns may be presented as a list of items, while image of the menu item is placed in the center. In block 820, augmented information 1210 for selected view 1104 is created based on at least one of the information or data retrieved above.

In block 830, augmented information 1210 may be adjusted based on at least one of pose tracking, contextual information, physical need(s) of user 130, or a combination thereof. In one embodiment, pose tracking may be used to anchor augmented information 1210 to printed menu 1002 to improve seamless augmentation. Pose tracking provides camera pose estimation in temporal image sequence that if motion of device 110 changes its orientation or the relative positon to printed menu 1002, augmented information 1210 may also be adjusted to be always aligned with recognized content 1108.

In one arrangement, the visual characteristics of augmented information 1210 may adapt to contextual information. For example, the level of brightness and/or the scale of the augmented information may be increased when the contextual information indicates a dark surrounding, or hues of the augmented information are adjusted to make augmented information 1210 more visible over visual content 1100. Visual characteristics may also be adjusted through color and/or shape to indicate nature of the augmented information (e.g., statement or warning, general or personal, etc.).

In one arrangement, augmented information 1210 may adapt to physical need(s) of user 130. Physical need(s) may be retrieved as part of the personal information. Personal information may include information not related to food or diet, such as physical limitations, life style, habit, education, and/or work experience, etc. For example, contrast of augmented information 1210 may be increased to improve content visibility for a user with weak vision capability.

In one embodiment, augmented information 1210 may be removed from the UI of device 110 after a pre-determined amount of time if no interaction has been detected. In one aspect, device 110 may present augmented information 1210 and begin fading it after a first pre-determined amount of time, with augmented information 1210 eventually disappearing entirely from the UI of device 110 after a second pre-determined amount of time. Method 600 may continue to loop and operate while view selection is ongoing.

Figure 9:
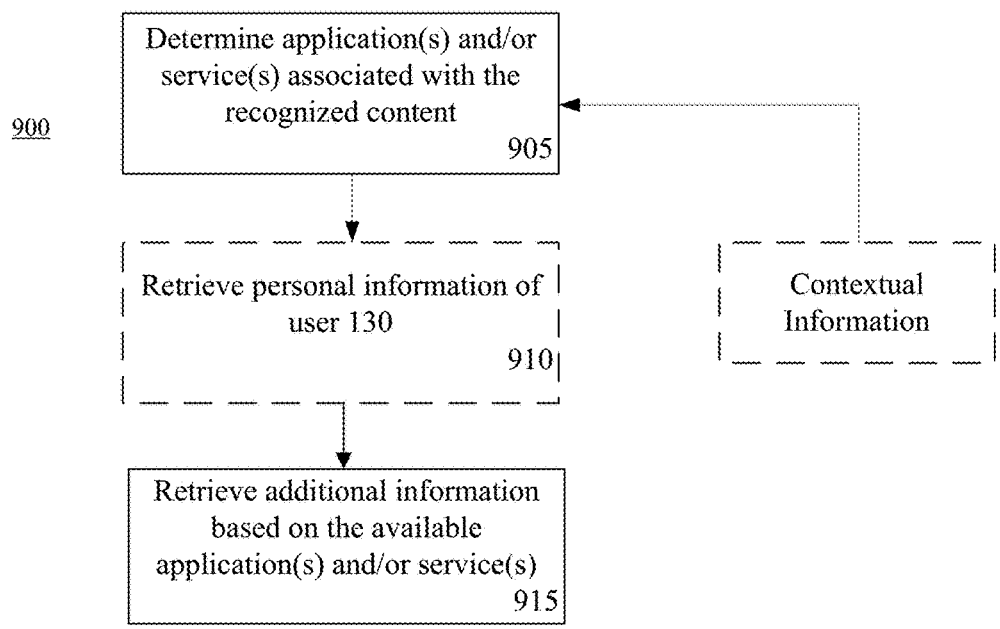
FIG. 9 is a flow chart illustrating an exemplary method of retrieving additional information for augmentation.

FIG. 9 is a flow chart illustrating an example method 900 of retrieving additional information based on recognized content 1108. In block 905, restaurant experience application 502 determines application(s) and/or service(s) that are associated with recognized content 1108. An application and/or a service is associated with recognized content 1108 if it is available for recognized content 1108 and is capable of providing further information based on recognized content 1108. An application or a service is available if it resides on device 110, or resides remotely by may be accessed by device 110 via network 140. Information of such applications and/or services may be configured and/or updated via user input, at runtime or during installation of restaurant experience application 502. Such information may also be pre-configured as a default setting of restaurant experience application 502.

Available application(s) and/or service(s) may be ranked for selection or presentation. Contextual information may be utilized to rank the available application(s) and/or service(s). For example, restaurant experience application 502 may identify two available payment services, payment service A and payment service B. Based on location of device 110, payment service A may be ranked over payment service B as the former has dominant market shares in the location. User past transactions or user preference may also help rank available application(s) and/or service(s). For example, noticing user 130 has consistently use payment service A for restaurant orders in the past couple days, restaurant experience application 502 may present payment service A over payment service B.

In block 910, personal information of user 130 may be retrieved. Personal information may be obtained by prompting user for further input, as illustrated in FIGS. 9 and 10. Personal information may be retrieved from other sources (e.g., from user's social network profile, from user's online postings, etc.). In one arrangement, step 910 may be optional. In another arrangement, step 905 may happen subsequent to step 910.

In one embodiment, personal information may be retrieved based on identity of user 130. Device 110 may determine the identity of user 130 utilizing various technologies, including but not limited to, facial recognition, voice recognition, UI interaction pattern recognition, etc. In one embodiment, user 130 may be prompted for input if device 110 is unable to determine the identity.

In one embodiment, personal information may be retrieved once for all as long as restaurant experience application 502 is active, and may be used for all recognized content. In one embodiment, personal information may be retrieved only upon determination of recognized content 1108. For example, every time a menu item is recognized, personal information may need to be retrieved. Such different practice may become more meaningful, with respect to storage constraint and network latency, when the personal information is retrieved from a source remote to device 110. In yet another embodiment, personal information may be retrieved based on recognized content 1108. For example, when the recognized content is a choice of wine, dairy preference may not be retrieved at all.

In one embodiment, personal information may be used to provide recommendation of an alternative entry when it is determined that there is conflict between the personal information and recognized content 1108. For example, personal information indicates that user 130 is allergic to egg, and recognized content 1108 is "chicken parmigiana," which contains egg ingredient. Restaurant experience application 502 may recommend an alternative entry that is deemed similar to "chicken parmigiana." The alternative dish may be another chicken dish or still "chicken parmigiana" with the meat breaded without using eggs. The digital representation may indicate availability of such alternative options.

In block 915, additional information based on recognized content 1108 may be retrieved from the available application(s) and/or service(s) determined in block 905. For example, the additional information may include nutrition analysis of "chicken parmesan," the recognized content illustrated in FIG. 15, where the nutrition analysis is retrieved from a nutrition service. For another example, the additional information may include a payment service option for processing of the order of "chicken parmesan." In one embodiment, additional information specific to user 130 may be retrieved based on the personal information retrieved in block 910. For example, the additional information may further include warning message about "chicken parmesan" when user 130 has a dairy-free diet practice. Method 900 may continue to loop and operate while content recognition is ongoing.

In FIG. 12, exemplary augmented information 1210 is presented, on interface circuitry 235 of device 110. Visual content 1100 is overlaid with a layer of augmented information 1210, based on selected view 1104. Augmented information 1210 may overlay visual content 1100 completed, partially, only over or next to selected view 1104. Visual effects of augmented information 1210 may take various formats. For example, it may maintain a level of transparency to give a see-through effect, or it may form an opaque layer that cloud overlapped content of visual content 1100.

In one example, when recognized content 1108 is a menu item "chicken parmigiana," augmented information 1210 may include a graphic image 1202 of the entry, and a series of nutrition information 1204 describing percentages of calorie, fat, carb, protein, cholesterol, etc. Nutrition information 1204 may be retrieved from an associated nutrition application or service. It has been discovered that augment information 1210 influences users' choice of food intake and helps users maintain a healthier diet.

In one embodiment, augmented information 1210 may also include notification and/or warning information, such as notification 1206, corresponding to nutrition information 1204 of recognized content 1108. Notification 1206 may provide general caution identifying ingredients that may be sensitive or intolerable for some people, that may lead to allergy attack, and/or that may be conflicting with religious beliefs. Notification 1206 may also be personalized to address user 130's particular health conditions, personal preference, and/or diet practice embraced by her religion or spiritual belief.

FIG. 12 further shows personalized notification 1208, which may warn user 130 of potential risks, confirm diet preference, and/or provide recommendations to achieve nutrition balance, based on diet preference and/or food allergy data specific to user 130. For example, user 130's diet type is "Pollo-Vegetarian," and personal notification 1208 indicates that the selected menu item has been verified to be complied with her diet type. If the selected menu item does not satisfy user 130's requirement, personal notification 1208 may change visual effect (e.g., different font color, shading effect, etc.) to indicate a conflict.

In one embodiment, nutrition information 1204 may also present information specific to user 130. For example, user 130 has restricted her daily sodium intake level. If the selected menu item contains higher amount of sodium, nutrition information 1204 may highlight the sodium level to indicate a warning.

In one embodiment, general notification may be filtered, based on user 130's personal preference and allergy data, to exclude information not applicable to user 130. For example, while a dish contains nuts, knowing that user 130 is not allergic to any nut, notification 1206 may not include information of nuts at all. In one embodiment, while all the general information is still included in notification 1206, data specific to user 130 may be visually distinguished, such as highlighted.

FIG. 13 shows an exemplary UI 1300 allowing user 130 to enter her diet preference. In one embodiment, diet preference of user 130 may be retrieved from another application or other sources. To improve user experience, UI 1300 pairs a graphic image with textual description so that even user 130 has difficulty understanding the language used for textual description, she can still manage to enter appropriate information following the graphic image.

FIG. 14 shows an exemplary UI 1400 allowing user 130 to provide her food allergy information. Food allergy information may be edited by category or type of food. User 130 may enter allergen that does not fall into any listed category or type. In one embodiment, if user 130 identifies that she is not aware of any allergy, selection of category or type of food may be disabled.

UIs illustrated in FIGS. 13 and 14 may be components of restaurant experience application 502, or of standalone applications. Ordinary people skilled in the art will appreciate that various UI layouts and interactions can be implemented to receive user input data.

It has been discovered that personalized augmented information helps prevent accidental intake of food items that may lead to health threats to the particular individual. More details will be described within this disclosure.

Moving back to FIG. 12, in one embodiment, augmented information 1210 enables a menu item ordering process based on recognized content 1108. For example, user 130 may click on "Order" button 1220 to order chicken parmigiana, the recognized menu item, instead of asking for a service person to order the dish. In one embodiment, the order may be communicated directly with the restaurant food ordering system. In one embodiment, the order may be passed to an ordering device used by the service person by establishing communication between device 110 and the ordering device, with the service person associating the order with table identification. In another embodiment, the order may be passed to an associated payment processing application or service. For example, user 130 places order outside of the restaurant for pickup and completes payment using associated payment service or application remotely. In yet another embodiment, user 130 initializes an order when waiting to be seated. Without table identification, the order is in standby. Once user 130 is seated, the order may be processed immediately with identification of the table. Ordinary people skilled in the art will appreciate that various UIs may be utilized to allow user 130 to interact with augmented information 1210 for the ordering process.

In another embodiment, other types of image recognition techniques may be deployed to recognize non-textual content of selected view 1104. For example, restaurant experience application 502 may recognize pictorial menu content as a specific type of appetizer, side, entry or dessert, and provide relevant augmented information.

In one embodiment, restaurant experience application 502 may communicate, work with, and/or integrate with other applications and/or services, which are either residing on device 110 or cloud based, to provide enhanced services utilizing the augmented information. Such applications and/or services may be launched/invoked/activated by restaurant experience application 502, or brought from the backend to the frontend by restaurant experience application 502.

Figure 15:
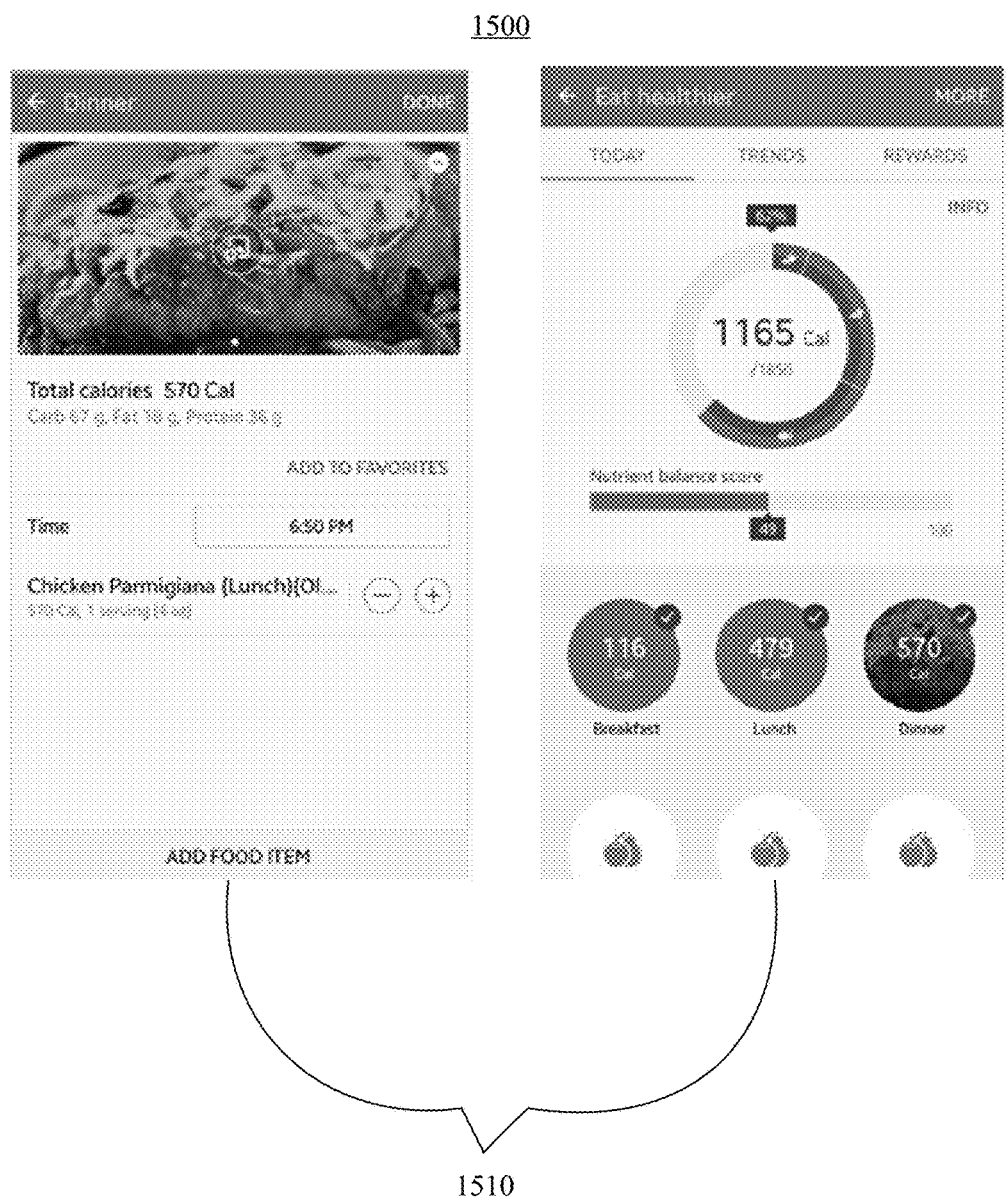
FIGS. 15 and 16(a)-16(c), taken collectively, illustrate examples of services associated with the application of FIG. 3

In one embodiment, restaurant experience application 502 may associate with a wellness type service or application, with which user 130 has registered. Wellness type service or application may be a health application, fitness application, or a combination thereof. In one embodiment, restaurant experience application 502 may import user profile data, including but not limited to, personal diet preference and food allergy data, from wellness program 1502. The imported user profile data may be used to build personalized notification 1208. Restaurant experience application 502 may export some or all of the additional information to wellness program 1502 for it to perform logging, monitoring and analysis of dietary intake. For example, wellness program 1502 may produce nutrient balance score based on nutrition information 1204 provided by restaurant experience application 502. In one embodiment, restaurant experience application 502 may cause contextual information to be shared with wellness program 1502 as well. For example, present time may be sent to wellness program 1502 for logging purpose. FIG. 15 illustrates exemplary UI 1500 of wellness program 1502. In FIG. 15(a), 6:50 PM is logged as the time of consumption of a food item, and is further determined as dinner. Based on such information, FIG. 15(b) illustrates additional analysis including calorie breakdown per meal for the day. Logged nutritional intake details of user 130 may be further used for her health benefits. For example, if the combined daily cholesterol exceeds a certain value, the exemplary UI 1500 can warn the user 130 about this, and make suggestions on her future menu selection to reduce cholesterol intake. In one embodiment, UI 1500 may become part of augmented information 1210.

In one embodiment, restaurant experience application 502 may associate with a payment type service or application, with which user 130 has registered and in which the restaurant participates. Payment type service or application may be a mobile payment system, digital wallet applications, or a combination thereof. In one embodiment, restaurant experience application 502 may import and choose from various methods of payment and discount stored in payment app/service 518, such as credit cards, restaurant gift cards, and/or restaurant coupons. A payment on the restaurant order can be made from payment system 1610.

Figure 16A:
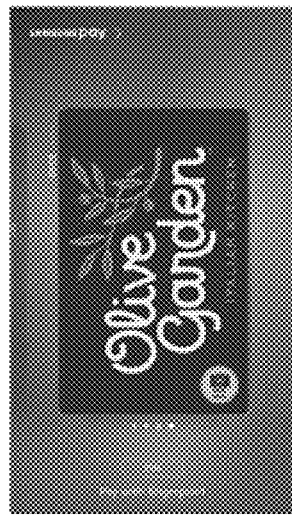
Figure 16B:
Figure 16C:
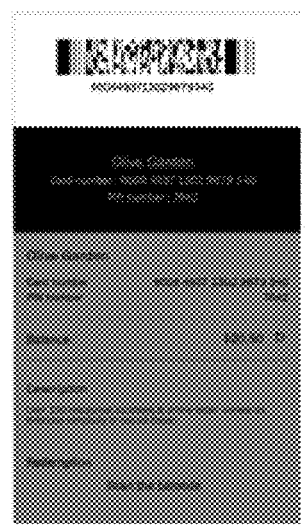

In one embodiment, restaurant experience application 502 may export some (e.g., information relevant to ordered items only) or all of the additional information to payment system 1610 for payment process. For example, restaurant experience application 502 may provide "Olive Garden" as recognized restaurant to payment system 1610. As shown in FIG. 16(a), payment system 1610 may prompt user 130 with a reward card or membership card specific to "Olive Garden." FIG. 16(b) illustrates that payment system 1610 may recommend Bank of America™ (BOA) visa card for payment processing. While user 130 may have multiple credit/debit cards registered with payment system 1610, BOA visa card is recommended because it offers the biggest discount, best mileage and/or cash back reward when it is used for payment of spending at "Olive Garden." FIG. 16(c) illustrates another exemplary display of gift card information 1630 on device 110. For example, payment system 1610 may retrieve a registered "Olive Garden" gift card with a positive balance, and formulates a summary to be presented as gift card information 1630. Payment system 1610 may has its own process for registration of such cards, and search for them based on recognized restaurant provided by restaurant experience application 502. Payment system 1610 may further search for information beyond the cards registered or stored in its system. In one embodiment, restaurant experience application 502 may search or recommend such card information based on recognized restaurant, and pass it on to payment system 1610 for further processing.

In one embodiment, restaurant experience application 502 may cause contextual information to be shared with payment system 1610 as well. For example, an event data identified by restaurant experience application 502, based on calendar data retrieved from device 110 or data retrieved from third party services, may be sent to payment system 1610 for activating event-specific coupon or promotion. For another example, information of user 130 as a frequent diner at a certain restaurant with preferences on certain dishes may be sent from restaurant experience application 502 to payment system 1610 for receiving periodic customized updates and promotion information from the restaurant.

Restaurant experience application 502 may display output of other applications and/or services through its own UI, or can direct user 130 to UIs of such applications and/or services.

As described within this disclosure, the term "gesture" means a predetermined motion of a body or portion of a body. A gesture may be a detected motion of a hand, arm, or user's entire body in a predetermined way. A gesture may be detected using camera(s) 240. A gesture may also be detected using interface circuitry 235, where the pattern and/or sequence of motion, the number of contact points, the duration of contacting or no-contacting, or a combination thereof may be detected as a gesture.

The terminology used herein is for the purpose of describing particular embodiments only and is not intended to be limiting. Notwithstanding, several description that apply throughout this document now will be presented.

As described herein, the singular forms "a," "an," and "the" are intended to include the plural forms as well, unless the context clearly indicates otherwise.

As described herein, the term "another" means at least a second or more.

As described herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As described herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

As described herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As described herein, the term "executable operation" or "operation" is a task performed by a data processing system, such as device 110, or a processor within a data processing system unless the context indicates otherwise. Examples of executable operations include, but are not limited to, "processing," "computing," "calculating," "determining," "displaying," "comparing," or the like. In this regard, operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As described herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As described herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As described herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As described herein, the term "output" means storing in physical memory elements, e.g., devices, writing to display or other peripheral output device, sending or transmitting to another system, exporting, or the like.

As described herein, the term "plurality" means two or more than two.

As described herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As described herein, the terms "program code," "software," "application," "program instructions," and "executable code" mean any expression, in any language, code or notation, of a set of instructions intended to cause a data processing system to perform a particular function either directly or after either or both of the following: a) conversion to another language, code, or notation; b) reproduction in a different material form. Examples of program code may include, but are not limited to, a subroutine, a function, a procedure, an object method, an object implementation, an executable application, an applet, a servlet, source code, object code, a shared library/dynamic load library and/or other sequence of instructions designed for execution on a computer system.

As described herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As described herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer readable storage medium (or media) may include computer readable program instructions thereon for causing a processor to carry out aspects of the present invention. Computer readable program instructions described herein may be downloaded to respective computing/processing devices from a computer readable storage medium or to an external computing device or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out processes, methods, features, and/or operations for the inventive arrangements described herein may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language and/or procedural programming languages. The computer readable program instructions, when read and executed by device 110, cause it to perform operations to execute the processes and features described herein. The computer readable program instructions may be executed entirely on device 110, partly on device 110, as a stand-alone software package, partly on device 110 and partly on a remote device or entirely on the remote device or server. In the latter scenario, the remote device may be connected to device 110 through any type of network, including a LAN or a WAN, or the connection may be made to an external device (for example, through the Internet using an Internet Service Provider). In some cases, electronic circuitry including, for example, processor(s), programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer readable storage media. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable storage media according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The corresponding structures, materials, acts, and equivalents of all means or step plus function elements that may be found in the claims below are intended to include any structure, material, or act for performing the function in combination with other claimed elements as specifically claimed.

The description of the inventive arrangements provided herein is for purposes of illustration and is not intended to be exhaustive or limited to the form and examples disclosed. None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A device, comprising:
    a camera configured to capture a live image data comprising an image of an object;
    a processor coupled to the camera and configured to:
        determine a plurality of businesses based on a location associated with the device;
        identify one business from the plurality of businesses based on at least one of audio data or calendar data;
        retrieve a digital representation associated with a selected portion of the image of the object based on the identified one business, and the digital representation is not converted from the image of the object and is retrieved from a source differs from the camera capturing the image of the object,
        recognize content of the selected portion based on contextual information and the digital representation, using computer vision technology, and
        generate a visual information based on the recognized content; and
    an interface circuitry coupled to the processor and configured to:
        present the live image data, and
        overlay the live image data with the visual information.

2. The device of claim 1, wherein the processor is further configured to:
    recognize the content of the selected portion by correlating the selected portion with the digital representation.

3. The device of claim 1, wherein the processor is further configured to:
    determine a first service associated with the recognized content;
    retrieve additional information related to the recognized content from the first service; and
    generate the visual information based on the additional information.

4. The device of claim 1, wherein the processor is further configured to:
    retrieve personal information of a user of the device, wherein the personal information includes a physical need of the user of the device; and
    generate the visual information based on the personal information.

5. The device of claim 1, wherein the processor is further configured to:
    detect an interaction with the visual information;
    activate a second service in response to the interaction; and
    presenting a user interface of the second service.

6. The device of claim 1, wherein the contextual information includes at least one of time, crowd-sourced data, or a combination thereof.

7. A method of image processing, comprising:
    presenting, by a device, a live image data captured by a camera coupled to the device, wherein the live image data comprises an image of an object;
    determining, by the device, a plurality of businesses based on a location associated with the device;
    identifying, by the device, one business from the plurality of businesses based on at least one of audio data or calendar data;
    retrieving, by the device, a digital representation associated with a selected portion of the image of the object based on the identified one business, and the digital representation is not converted from the image of the object and is retrieved from a source differs from the camera capturing the image of the object;

recognizing, by the device and using computer vision technology, content of the selected portion based on contextual information and the digital representation;

generating, by the device, a visual information based on the recognized content; and overlaying, by the device, the live image data with the visual information.

8. The method of claim 7, further comprising:
recognizing the content of the selected portion by correlating the selected portion with the digital representation.

9. The method of claim 7, further comprising:
determining a first service associated with the recognized content;
retrieving additional information related to the recognized content from the first service; and
generating the visual information based on the additional information.

10. The method of claim 7, further comprising:
retrieving personal information of a user of the device, wherein the personal information includes a physical need of the user of the device; and
generating the visual information based on the personal information.

11. The method of claim 7, further comprising:
detecting an interaction with the visual information;
activating a second service in response to the interaction; and
presenting a user interface of the second service.

12. The method of claim 7, wherein the contextual information includes at least one of time, crowd-sourced data, or a combination thereof.

13. The method of claim 7, wherein the object comprises an eatery menu, a page of a book, a ticket, and a poster.

14. The method of claim 7, wherein the visual information is formulated based on at least one of a rule, a presentation style template, guidance provided by a 3rd party, learnt preference of a user of the device, or a combination thereof.

15. A non-transitory computer readable storage medium including computer readable program instructions that, when executed by a processor, cause the processor to perform a method comprising:
presenting, by a device, a live image data captured by a camera coupled to the device, wherein the live image data comprises an image of an object;
determining, by the device, a plurality of businesses based on a location associated with the device;
identifying, by the device, one business from the plurality of businesses based on at least one of audio data or calendar data;
retrieving, by the device, a digital representation associated with a selected portion of the image of the object based on the identified one business, and the digital representation is not converted from the image of the object and is retrieved from a source differs from the camera capturing the image of the object;
recognizing, by the device and using computer vision technology, content of the selected portion based on contextual information and the digital representation;
generating, by the device, a visual information based on the recognized content; and
overlaying, by the device, the live image data with the visual information.

16. The non-transitory computer readable storage medium of claim 15, wherein the method further comprises:
recognizing the content of the selected portion by correlating the selected portion with the digital representation.

17. The non-transitory computer readable storage medium of claim 15, the method further comprises:
determining a first service associated with the recognized content;
retrieving additional information related to the recognized content from the first service; and
generating the visual information based on the additional information.

18. The non-transitory computer readable storage medium of claim 15, the method further comprises:
retrieving personal information of a user of the device, wherein the personal information includes a physical need of the user of the device; and
generating the visual information based on the personal information.

19. The non-transitory computer readable storage medium of claim 15, the method further comprises:
detecting an interaction with the visual information;
activating a second service in response to the interaction; and
presenting a user interface of the second service.

20. The non-transitory computer readable storage medium of claim 15, wherein the contextual information includes at least one of time, crowd-sourced data, or a combination thereof.

* * * * *